United States Patent [19]

Stemme et al.

[11] 4,270,854
[45] Jun. 2, 1981

[54] PHOTOGRAPHIC INSTANT CAMERA WITH MAGNETIC RECORDING CAPABILITY

[75] Inventors: Otto Stemme, Munich; Frank Staudacher, Haan; Peter Lermann, Post Feldkirchen; Eduard Wagensonner, Aschheim, all of Fed. Rep. of Germany

[73] Assignee: AGFA-Gevaert, A.G., Leverkusen, Fed. Rep. of Germany

[21] Appl. No.: 74,121

[22] Filed: Sep. 10, 1979

[30] Foreign Application Priority Data

Sep. 14, 1978 [DE] Fed. Rep. of Germany ....... 2840051

[51] Int. Cl.³ .............................................. G03B 29/00
[52] U.S. Cl. .......................................... 354/76; 354/86
[58] Field of Search ....................... 354/75, 76, 83, 86; 360/1-3, 101; 353/15, 19, 120

[56] References Cited

U.S. PATENT DOCUMENTS 3,685,836  8/1972  Chernowitz ..................... 360/101 X
3,822,376  7/1974  Kok et al. ........................ 360/101 X

FOREIGN PATENT DOCUMENTS 2720575  11/1978  Fed. Rep. of Germany ............. 354/76

OTHER PUBLICATIONS

Wunsch, P., "Sound-Recording and/or Reproducing Self-Processing Camera", in Research Disclosure, #1635D, 11-1977, pp. 43, 44.

Primary Examiner—John Gonzales
Attorney, Agent, or Firm—Michael J. Striker

[57] ABSTRACT

A sheet of exposed and developed instant-camera film is discharged from an instant camera and then inserted by the user into a film-holding structure on the back of the camera which very accurately positions the film sheet, such that upon removal and reinsertion of the film sheet into the holding structure the film sheet will always assume a predetermined position. The camera is provided with a multihead magnetic head unit mounted for reciprocating motion along a magnetic strip or coating provided at a marginal portion of the inserted film sheet. During first-direction travel of the head unit, one head records, and during second-direction travel of the head unit a different and differently located head records onto a further segment of the magnetic strip. After recording, the recorded information, e.g., spoken words identifying the subject just photographed, can be reproduced, and if desired erased.

5 Claims, 4 Drawing Figures

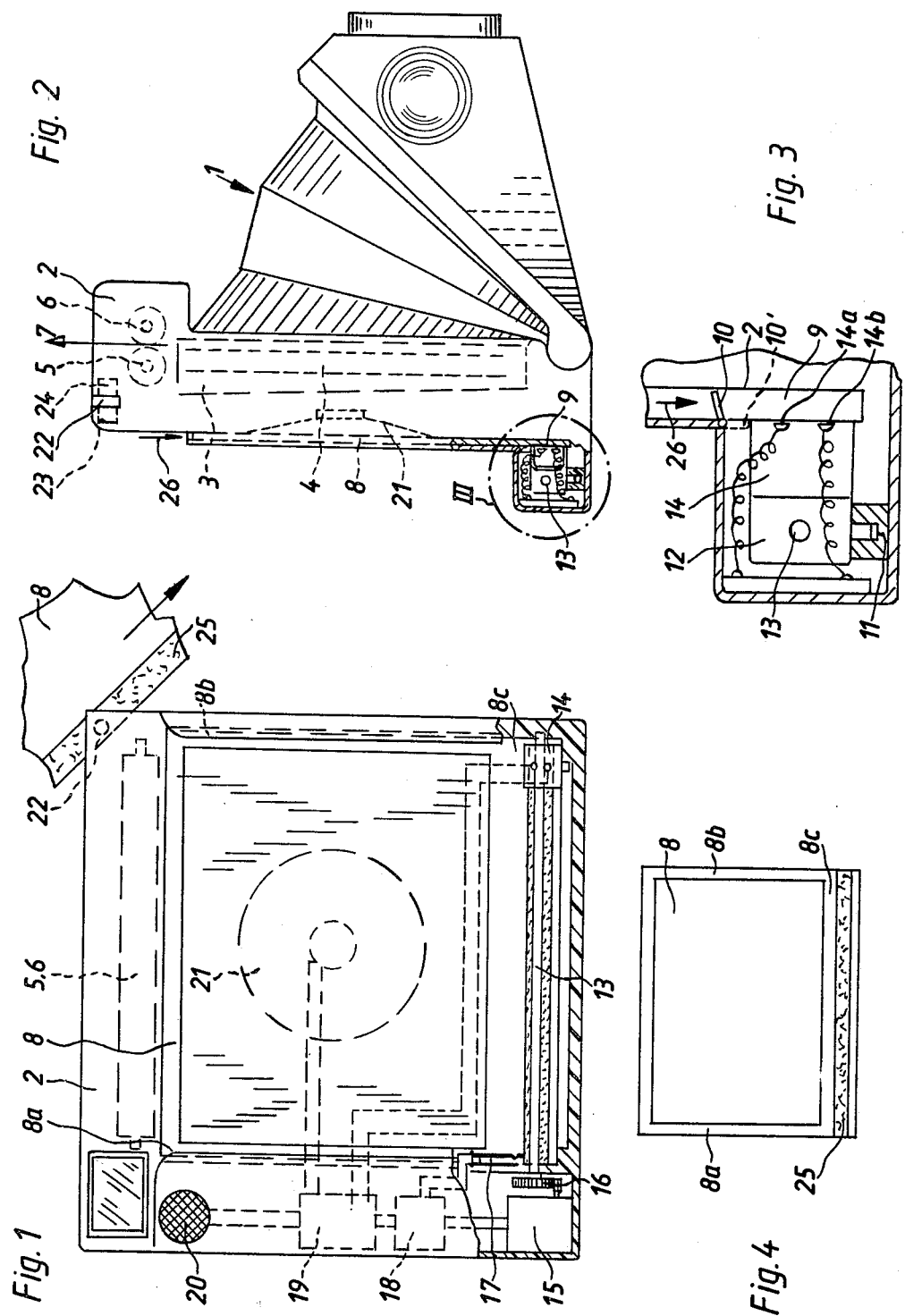

PHOTOGRAPHIC INSTANT CAMERA WITH MAGNETIC RECORDING CAPABILITY

BACKGROUND OF THE INVENTION

The present invention concerns photographic instant cameras, of which of course a considerable variety of types have come to be known. Most recently, such instant cameras have been designed to discharge a single discrete unit of film consisting of one still shot upon each performance of an exposure, such discrete units of discharged film including developer pouches and paste traps even when in developed state. The discharged stills have correspondingly broadened edge portions, which in part are suitable for the application of written inscriptions. The same applies for roll-pack instant cameras in which each discharged unit of film must be severed, by one or another means, from the remainder of the roll-pack.

The user of such an instant camera will not, of course, always have available a suitable writing instrument for applying written inscriptions to the discharged picture, although it is often desirable to provide written information on the discharged picture as soon as possible after discharge, e.g., before such pictures are laid aside and their significance or identity forgotten.

SUMMARY OF THE INVENTION

It is a general object of the invention to provide an instant photographic camera and photographic recording medium therefor so designed as to permit very immediate recording of information upon the exposed recording medium.

In accordance with the present invention, the instant-camera film employed is provided with at least one magnetizable region per picture, and the instant camera with which it is used is provided with magnetic recording means for magnetically recording information on the pictures.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a partly sectioned rear view of an exemplary embodiment of the inventive camera;

FIG. 2 is a partly sectioned side view of the camera of FIG. 1;

FIG. 3 is an enlarged detail view of the portion of FIG. 2 contained in circle III; and FIG. 4 depicts an exemplary embodiment of the instant-camera film employed.

DESCRIPTION OF THE PREFERRED EMBODIMENTS

The camera depicted in FIGS. 1-3 comprises a housing 1, of which only its rear part 2 need be described in detail for an understanding of the illustrated embodiment. Rear housing part 2 accommodates a film cassette 3 which contains a stack of discrete, individually dischargeable units of instant-camera film 4. Located near the discharge slot of cassette 3 are two conventional developer rollers 5 and 6 which, in cooperation with a conventional (non-illustrated) gripper mechanism, operate to transport each successive uppermost unit of film 4 out of the cassette 3 and out of the camera.

The back side of the camera housing mounts a holding structure for holding one sheet 8 of instant-camera film. As shown in FIG. 1, the holding structure includes portions which overlap and positively hold the left and right lateral edges 8a and 8b of the sheet of film 8. The holding structure furthermore includes a slot 9 (see also FIG. 3) which receives the bottom edge portion 3c of the inserted film sheet 8, at which the developer pouch of the instant-camera film sheet is located.

As shown in FIG. 3, when no instant-camera film sheet has been inserted bottom chamber 9 is closed off by an upwardly biased cover flap 10, which serves to prevent the entry of dirt into bottom chamber 9. The front wall of bottom chamber 9 is formed by the rear wall of the main part of the rear of the camera housing. At the other, more rearward end of the bottom chamber 9, there is provided an elongated mounting groove 11 which mounts the leftward-rightward sliding motion a mounting structure 12 for a two-head magnetic-head unit 14. The two heads of head unit 14 are respectively denoted by 14a and 14b. The mounting structure 12 for head unit 14 is driven by a screw spindle 13 of appropriate pitch, the spindle 13 being rotatable in opposite directions to effect a first-direction and an opposite-direction leftwards-rightwards stroke of two-head unit 14.

Drive spindle 13 is driven by an electric motor 15 through the intermediary of a transmission 16, the motor being powered by the camera's (non-illustrated) batteries. At each of the two end positions of the path of reciprocation of head unit 14, there is provided a respective limit switch 17, only one shown in FIG. 1 for the sake of clarity. Electric motor 15 is controlled by an electronic motor-control circuit 18, whose operation is described below.

The two magnetic heads 14a, 14b are connected to an amplifier stage 19, which is in turn connected to a microphone 20 and a speaker 21 both provided on the back wall of the camera, via shielded leads to suppress transmission of operating noise originating from electric motor 15 and drive spindle 13.

The rear portion 2 of the camera housing is further provided, at its upper right corner as viewed in FIG. 1, with a slit 22, to both sides of which are located respective permanent magnets 23 and 24. The slit 23 is of such a breadth that a sheet of film 8 can be inserted into it, and is of such a depth that the magnetizable track 25 on the bottom marginal portion 8c of a sheet of film 8 inserted into and drawn through slit 22 will be moved through the magnetic field between permanent magnets 23 and 24.

The illustrated apparatus operates as follows:

The uppermost sheet of cassette film 8, after being exposed, is ejected from the camera in the direction of arrow 7, by conventional means. The ejected film sheet 8 is then inserted, in the direction of arrow 26 in FIG. 2, into the film-holding structure at the back of the camera housing. Upon such insertion, the magnetizable portion 25 located at the bottom marginal portion 8c of film sheet 8 is engaged by the heads 14a and 14b of the head unit 14, the bottom marginal portion 8c deflecting flap member 10 from its solid-line to its broken-line position 10' (FIG. 3) upon such insertion, and the head unit 14 being initially in its starting position depicted in FIG. 1.

The user flips a (non-illustrated) mode selection switch to select the record mode of operation, and amplifier stage 19 becomes connected to microphone 20 for recording operation.

Initially, first magnetic head 14a is switched into circuit and head 14b switched out of circuit. Motor-control circuit 18 energizes electric motor 15, rotating drive spindle 13 in such a direction that the head unit 14 (as viewed in FIG. 1) moves leftwards out from its illustrated starting position, recording the information received from microphone 20 onto the first track on magnetizable region 25, this first track being associated with first magnetic head 14a. When head unit 14 reaches the left limit of its range of travel and activates limit switch 17, motor-control circuit 18 reverses the direction of motor 15 and the head unit 14 commences to return rightwards to its starting position. During rightwards travel of head unit 14, magnetic head 14a is switched out of circuit and head 14b is switched into circuit, so that recording now continue on the second or lower magnetic track of region 25, associated with second magnetic head 14b. When the head unit 14 has returned to its starting position, electric motor 15 is deenergized and comes to a halt, its direction-reversing switches change state in preparation for the next leftwards stroke of head unit 14, and the recording operation is finished.

The user then flips the (non-illustrated) mode selector switch to playback mode, and the head unit 14 repeats the leftwards and then rightwards stroke, with the magnetic head 14a and then afterwards the head 14b switched into circuit. During the playback mode, the amplifier stage 19 is instead connected to drive the speaker 21 of the camera. The information just recorded is now audibly reproduced.

If the recording just made is unsatisfactory to the user, he pulls the film sheet 8 out of the film holding structure and draws its edge 8c through the slit 22, as a result of which the permanent magnets 23, 24 erase the just made recording, so that the user can effect a second and satisfactory recording operation.

Further details of a recording/playback control circuit suitable for use herein as disclosed in commonly owned U.S. patent application Ser. No. 74,115 filed Sept. 10, 1979 by Otto Stemme et al and entitled "PLAYBACK AND/OR RECORDING DEVICE FOR MAGNETIC RECORDING MEDIA, ESPECIALLY STILL PHOTOGRAPHS PROVIDED WITH A MAGNETIZABLE COATING." The disclosure of which is incorporated by reference.

It will be understood that each of the elements described above, or two or more together, may also find a useful application in other types of constructions and modes of operation differing from the types described above.

While the invention has been illustrated and described as embodied in conjunction with an instant camera which discharges discrete film sheets stored in a film sheet cassette, it is not intended to be limited to the details shown, since various modifications and structural changes may be made without departing in any way from the spirit of the present invention.

Thus, for example, instead of two magnetic heads the head unit 14 could be provided with a greater number, if a greater recording capacity is required, or with only a single head if the reduced capacity is adequate. Likewise, in lieu of the preferred permanent-magnet erasing capability, the head unit 14 could be provided with a further, erase head or could perform a further stroke of movement for erasure alone, during which its one or more magnetic heads are energized to implement an erasure of recorded information, i.e., utilizing an erasure frequency outside the range of audio frequency of the amplifier stage 19. Similarly, instead of using discrete transducers as a microphone and as a speaker, a single transducer could be alternatively employed as microphone and then speaker, by suitable switchover action involving reversal of the connections of the amplifier-stage input and output to the heads and to such double-purpose transducer.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In a photographic instant camera, a combination comprising a housing adapted to hold a film pack composed of a plurality of self-developing film sheets each having a margin provided with a magnetizable portion, said housing including a wall provided with a slot into which only said margin is insertable; magnetic recording means in said housing and including a magnetic recording head mounted for movement along said slot and a film sheet margin inserted therethrough, for magnetically recording information onto said magnetizable portion of the respective film sheet; and amplifier means for transmitting electrical signals to the movably mounted magnetic recording head.

2. In an instant camera as defined in claim 1, furthermore including drive means for moving the movably mounted magnetic head.

3. In an instant camera as defined in claim 2, the drive means being an electric motor.

4. In an instant camera as defined in claim 2, the camera being provided with a magnetic head unit provided with said magnetic head and with at least one further magnetic head differently located to track different portions of a magnetic track during travel of the magnetic head unit in respective directions and limit switch means for reversing the direction of travel of the magnetic head unit when the latter reaches a limit of its range of travel.

5. In an instant camera as defined in claim 1, said housing being provided with permanent magnet means for erasing information magnetically recorded on a sheet of film, the permanent magnet means being so located that a sheet of film can be drawn over the permanent magnet means to effect erasure of magnetically recorded information.

* * * * *